(12) United States Patent
Geoghegan et al.

(10) Patent No.: US 12,492,158 B2
(45) Date of Patent: Dec. 9, 2025

(54) (S,Z)-3,7-DIMETHYLNON-6-EN-1-OL AND ITS USE AS FRAGRANCE

(71) Applicant: Givaudan SA, Vernier (CH)

(72) Inventors: Kimberly Geoghegan, Kemptthal (CH); Marc Liniger, Embrach (CH); Fridtjof Schröder, Hettlingen (CH)

(73) Assignee: Givaudan SA, Vernier (CH)

( * ) Notice: Subject to any disclaimer, the term of this patent is extended or adjusted under 35 U.S.C. 154(b) by 604 days.

(21) Appl. No.: 17/905,876

(22) PCT Filed: Apr. 6, 2021

(86) PCT No.: PCT/EP2021/058848
§ 371 (c)(1),
(2) Date: Sep. 8, 2022

(87) PCT Pub. No.: WO2021/198525
PCT Pub. Date: Oct. 7, 2021

(65) Prior Publication Data
US 2023/0167042 A1 Jun. 1, 2023

(51) Int. Cl.
*C07C 33/025* (2006.01)
*C11B 9/00* (2006.01)

(52) U.S. Cl.
CPC .......... *C07C 33/025* (2013.01); *C11B 9/0015* (2013.01); *C07B 2200/07* (2013.01); *C07B 2200/09* (2013.01)

(58) Field of Classification Search
None
See application file for complete search history.

(56) References Cited

U.S. PATENT DOCUMENTS

| 3,723,447 A | 3/1973 | Diekman et al. |
| 8,754,028 B2 | 6/2014 | Velazquez et al. |

FOREIGN PATENT DOCUMENTS

| CN | 109846734 A | 6/2019 |
| CN | 110251425 A | 9/2019 |

OTHER PUBLICATIONS

Shibata et al, Syntheses of Racemic and Disastereomeric Mixtures of 3,7,11,15-Tetramethylhentriacontane and 4,8, 12, 16-Tetramethyldotriacontane, the cuticular tetramethylalkanes of the Tsetse Fly, *Glossina brevipalpis*, Biosci. Biotechnol. Biochem., 66(3), 582-587, 2002 (Year: 2002).*
International Search Report for Application No. PCT/EP2021/058848 dated Jul. 22, 2021.
Written Opinion for Application No. PCT/EP2021/058848 dated Jul. 22, 2021.
Great Britain Search Report for Application No. 2004876.5 dated Sep. 16, 2020.
Ren Jian-Nan, et al., Free and Bound Aroma Compounds in Raspberry Juice, China Academic Journal Electronic Publishing House, Jan. 1, 2013, vol. 34, Issue 2.
W. Rojahn, et al., The synthesis of certain homologous monocyclic terpene oxides, Dragoco Report, 1978, pp. 248-253, vol. 25, Issue 11-12.
Akbar Saba, et al., Hydrothermal Liquefaction of Loblolly Pine: Effects of Various Wastes on Produced Biocrude, ACS Omega, Mar. 14, 2018, pp. 3051-3059, vol. 3, ACS Publications.
Bhupinder Singh Punia, et al., Analysis of Illicit Liquor by Headspace Gas Chromatography-Mass Spectrometry (HS-GC-MS): A Preliminary Study, Journal of AOAC International, Food Composition and Additives, 2017, pp. 109-125, vol. 100, Issue 1.
Li Kang-Le, et al., Analysis of volatile components of three entomogenous fungi by SDE-GC-MS, Mycosystema, Jan. 15, 2012, Table 3, p. 97, vol. 31, Issue 1.
Chie Shibata, et al., Syntheses of Racemic and Diastereomeric Mixtures of 3,7,11,15-Tetramethylhentriacontane and 4,8,12,16-Tetramethyldotriacontane, the Cuticular Tetramethylalkanes of the Tsetse Fly, *Glossina brevipalpis*, Bioscience, Biotechnology, and Biochemistry, Mar. 2002, pp. 585-587, vol. 66, Issue 3, JSBA.

* cited by examiner

*Primary Examiner* — Jessica Whiteley
(74) *Attorney, Agent, or Firm* — Curatolo, Sidoti & Trillis Co., LPA; Floyd Trillis, III; Salvatore A. Sidoti

(57) ABSTRACT

A compound according to formula IIa, which is (S,Z)-3,7-dimethylnon-6-en-1-ol and its use as fragrance.

(IIa)

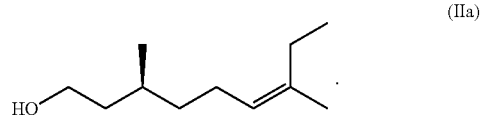

16 Claims, No Drawings

(S,Z)-3,7-DIMETHYLNON-6-EN-1-OL AND ITS USE AS FRAGRANCE

CROSS REFERENCE TO RELATED APPLICATIONS

This application is a national stage application of International Application No. PCT/EP2021/058848, filed 6 Apr. 2021, which claims priority from Great Britain Patent Application No. 2004876.5, filed 2 Apr. 2020, both of which applications are incorporated herein by reference.

The present invention is directed to a novel organic compound, a method of preparing said compound and its use as fragrance ingredient. The invention also relates to perfume compositions and to articles, such as fine fragrances or consumer product compositions perfumed by the compound, or the perfume compositions containing said compound.

BACKGROUND OF THE INVENTION

Citronellol (dihydrogeraniol, 3,7-dimethyloct-6-en-1-ol, compound of formula (I)) is widely used as fragrance and food ingredient. It has a floral, rose citrus smell and flavour. While it is safe to be used in food, some concerns have been raised for its use in perfumery, as it might cause allergic reactions to some people. Citronellol figures on the list of 26 Fragrance Allergens designated by the European Union. Perfumes containing Citronellol have to be labelled accordingly.

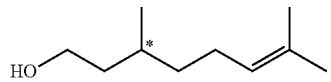

(I)

Citronellol possesses one chiral center indicated by a star in the compound of formula (I), and both enantiomers occur in nature. (+)-Citronellol, which is found in citronella oils (for example in *Cymbopogon nardus*), is the more common isomer. (—)-Citronellol is found in the oils of rose and *Pelargonium geraniums*.

DESCRIPTION OF THE INVENTION 3,7-dimethylnon-6-en-1-ol (Ethyl Citronellol, compound of formula (II)) corresponds to Citronellol formally extended by one methyl group. It is a compound with one stereocenter and a double bond, and can occur in four stereoisomers in total.

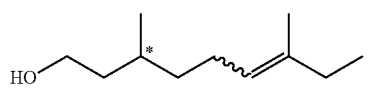

(II)

In the compound of formula (II), the star is indicating a stereocenter at the C-atom, and the wavy bond is indicating an unspecified configuration of the adjacent double bond.

3,7-dimethylnon-6-en-1-ol has been reported previously. It was identified by GC-MS as a compound in raspberry juice (*Shipin Kexue* 2013, 34, 199-203) and in fungi (*Junwu Xuebao* 2012, 31, 92-101). It can be obtained from Citronellol in a four step synthesis (*Biosci. Biotechnol. Biochem.* 2002, 66, 582-587). It can also be prepared from methyl ethyl ketone in a seven step synthesis according to a report by Dragoco (1978 11/12, 235). However, its fragrance properties have not been reported so far.

It was now surprisingly found that Ethyl Citronellol possess a floral rosy, Citronellol, peony, lychee odour, and a Gas Chromatography (GC) threshold of 0.22 ng. So in a first aspect of the invention, the compound of formula (II) can be used as fragrance material, for example as replacer for Citronellol. It does not figure on the list of 26 Fragrance Allergens designated by the European Union.

Surprisingly it was further found that the perfumistic benefit of the compound of formula (II) depends on the stereochemistry: only one stereoisomer out of four is a strong odourant, while the others show only very weak odourant properties, if any. In addition, none of the isomers of 3,7-dimethylnon-6-en-1-ol is on the list of 26 Fragrance Allergens designated by the European Union.

So in a further aspect of the invention, there is provided (S,Z)-3,7-dimethylnon-6-en-1-ol (IIa).

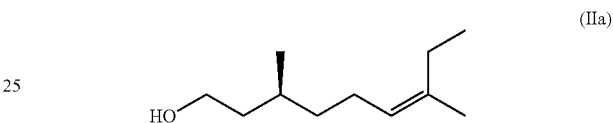

(IIa)

Said compound has a surprisingly low Gas Chromatography (GC) threshold of 0.032 ng, compared to the GC threshold of Citronellol of 1.8 ng. Such a performant molecule, with a GC threshold by a factor 100 lower than Citronellol, can be used in lower dosage, resulting in less exposure for humans and the environment. It has a floral, rosy, fruity, lychee odour. It is a fragrance material, and could be used as a replacer for Citronellol.

In a further aspect of the invention, there is provided an isomeric mixture (referred to in the following text as the isomeric mixture) comprising (S,Z)-3,7-dimethylnon-6-en-1-ol (IIa) and at least one other compound selected from the group consisting of:
(R,E)-3,7-dimethylnon-6-en-1-ol (IIb),
(S,E)-3,7-dimethylnon-6-en-1-ol (IIc), and
(R,Z)-3,7-dimethylnon-6-en-1-ol (IId).

(IIb)

(IIc)

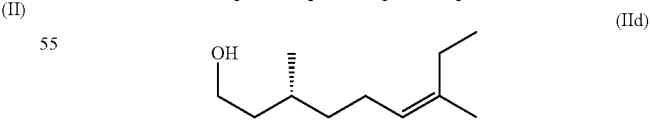

(IId)

(R,E)-3,7-dimethylnon-6-en-1-ol (IIb) has a GC threshold of 0.75 ng, which is still lower than the value for Citronellol. It has a dusty, waxy, rosy, tetrahydrogeranol, pelargol—like, technical, harsh odour. It blends well with IIa, adds volume, and complements the overall odour impression.

(S,E)-3,7-dimethylnon-6-en-1-ol (IIc) and (R,Z)-3,7-dimethylnon-6-en-1-ol (IId) are both weak odourants with a GC threshold value of 2.2 ng and 3.4 ng, respectively. Their odour is described as fatty, and fatty floral. They do not contribute significantly to the overall odour of the isomeric mixture.

If a compound exists in the form of different stereoisomers, it might be used as a mixture. Alternatively, it may be resolved in groups of diasteroisomers or as pure stereoisomers. Resolving stereoisomers adds to the complexity of manufacture and purification of the compound, and so it is preferred to use the compound as mixture of its stereoisomers simply for economic reasons. However, if it is desired to prepare individual stereoisomers, this may be achieved according to methods known in the art, e.g. stereoselective synthesis, preparative HPLC and GC.

In one aspect of the invention, the compound of formula (IIa) is provided in highly enriched or essentially pure form, with low amounts or essentially free of compounds (IIb), (IIc) and/or (IId). That means that the compound of formula (IIa) is present in at least 90 weight %, particularly in at least 95 weight %, more particularly in at least 98 weight %, even more particularly in 99 weight % or higher.

In another aspect of the invention, the isomeric mixture is provided, comprising a considerable amount of the compound of formula (IIa) along with compounds (IIb), (IIc) and/or (IId). That means that the compound of formula (IIa) is present in at least 20 weight %, particularly in at least 30 weight %, more particularly in at least 40 weight %, even more particularly in 50 weight % or higher. The weight ratio of the compound of formula (IIa) to the compound of formula (IIb) in the isomeric mixture may range from about 4:6 to about 99:1.

In another aspect of the invention, a mixture of (S)-isomers (IIa) and (IIc) is provided, in pure or enantio-enriched form. A racemic mixture of (S)-isomers (IIa) and (IIc) has a GC threshold of 0.93 ng.

In a further aspect of the invention, there is provided a use as fragrance of a compound according to formula (IIa) or of the isomeric mixture comprising (S,Z)-3,7-dimethylnon-6-en-1-ol (IIa) and at least one other compound selected from the group consisting of:
(R,E)-3,7-dimethylnon-6-en-1-ol (IIb),
(S,E)-3,7-dimethylnon-6-en-1-ol (IIc), and
(R,Z)-3,7-dimethylnon-6-en-1-ol (IId).

In yet another aspect of the present invention, there is provided a perfume composition comprising a compound according to formula (IIa) or the isomeric mixture comprising (S,Z)-3,7-dimethylnon-6-en-1-ol (IIa) and at least one other compound selected from the group consisting of:
(R,E)-3,7-dimethylnon-6-en-1-ol (IIb),
(S,E)-3,7-dimethylnon-6-en-1-ol (IIc), and
(R,Z)-3,7-dimethylnon-6-en-1-ol (IId).

The compound or the isomeric mixture of the invention may be used alone, or in combination with known odourant molecules selected from the extensive range of natural products, and synthetic molecules currently available, such as essential oils, alcohols, aldehydes and ketones, ethers and acetals, esters and lactones, macrocycles and heterocycles, and/or in admixture with one or more ingredients or excipients conventionally used in conjunction with odourants in perfume compositions, for example, carrier materials, and other auxiliary agents commonly used in the art.

As used herein, "carrier material" means a material which is practically neutral from a odourant point of view, i.e. a material that does not significantly alter the organoleptic properties of odourants.

The term "auxiliary agent" refers to ingredients that might be employed in a perfume composition for reasons not specifically related to the olfactive performance of said composition. For example, an auxiliary agent may be an ingredient that acts as an aid to processing a fragrance ingredient or ingredients, or a composition containing said ingredient(s), or it may improve handling or storage of a fragrance ingredient or composition containing same. It might also be an ingredient that provides additional benefits such as imparting color or texture. It might also be an ingredient that imparts light resistance or chemical stability to one or more ingredients contained in a perfume composition. A detailed description of the nature and type of adjuvants commonly used in perfume compositions containing same cannot be exhaustive, but it has to be mentioned that said ingredients are well known to a person skilled in the art.

As used herein, "perfume composition" means any composition comprising the compound according to formula (IIa) or the isomeric mixture and a base material, e.g. a diluent conventionally used in conjunction with odourants, such as diethyl phthalate (DEP), dipropylene glycol (DPG), isopropyl myristate (IPM), pentane-1,2-diol, triethyl citrate (TEC) and alcohol (e.g. ethanol). Optionally, the composition may comprise an anti-oxidant adjuvant. Said anti-oxidant may be selected from Tinogard® TT (BASF), Tinogard® Q (BASF), Tocopherol (including its isomers, CAS 59-02-9; 364-49-8; 18920-62-2; 121854-78-2), 2,6-bis (1,1-dimethylethyl)-4-methylphenol (BHT, CAS 128-37-0) and related phenols, hydroquinones (CAS 121-31-9).

The following list comprises examples of known odourant molecules, which may be combined with the compound according to formula (IIa) or the isomeric mixture:

essential oils and extracts, e.g. castoreum, costus root oil, oak moss absolute, geranium oil, tree moss absolute, basil oil, fruit oils, such as bergamot oil and mandarine oil, myrtle oil, palmarose oil, patchouli oil, petitgrain oil, jasmine oil, rose oil, sandalwood oil, wormwood oil, lavender oil and/or ylang-ylang oil;

alcohols, e.g. cinnamic alcohol ((E)-3-phenylprop-2-en-1-ol); cis-3-hexenol ((Z)-hex en-1-01); Citronellol (3,7-dimethyloct-6-en-1-ol); dihydro myrcenol (2,6-dimethyloct en-2-ol); Ebanol™ ((E)-3-methyl-5-(2,2,3-trimethylcyclopent-3-en-1-yl)pent-4-en-2-ol); eugenol (4-allyl-2-methoxyphenol); ethyl linalool ((E)-3,7-dimethylnona-1,6-dien-3-ol); farnesol ((2E,6Z)-3,7,11-trimethyldodeca-2,6,10-trien-1-ol); geraniol ((E)-3,7-dimethylocta-2,6-dien-1-ol); Super Muguet™ ((E)-6-ethyl-3-methyloct-6-en-1-ol); linalool (3,7-dimethylocta-1,6-dien-3-ol); menthol (2-isopropyl-5-methylcyclohexanol); Nerol (3,7-dimethyl-2,6-octadien-1-ol); phenyl ethyl alcohol (2-phenylethanol); Rhodinol™ (3,7-dimethyloct-6-en-1-ol); Sandalore™ (3-methyl-5-(2,2,3-trimethylcyclopent-3-en-1-yl)pentan-2-ol); terpineol (2-(4-methylcyclohex-3-en-1-yl) propan-2-ol); or Timberol™ (1-(2,2,6-trimethylcyclohexyl)hexan-3-ol); 2,4,7-trimethylocta-2,6-dien-1-ol, and/or [1-methyl-2(5-methylhex-4-en-2-yl)cyclopropyl]-methanol;

aldehydes and ketones, e.g. anisaldehyde (4-methoxybenzaldehyde); alpha amyl cinnamic aldehyde (2-benzylideneheptanal); Georgywood™ (1-(1,2,8,8-tetramethyl-1,2,3,4,5,6,7,8-octahydronaphthalen-2-yl) ethanone); Hydroxycitronellal (7-hydroxy-3,7-dimethyloctanal); Iso E Super® (1-(2,3,8,8-tetramethyl-1,2,3,4,5,6,7,8-octahydronaphthalen-2-yl) ethanone); Isoraldeine® ((E)-3-methyl-4-(2,6,6-trimethylcyclohex-2-en-1-yl)but-3-en-2-one); Hedione® (methyl 3-oxo-2-pentylcyclopentaneacetate); 3-(4-isobutyl-2-methylphenyl)propanal; maltol; methyl cedryl ketone; methylionone; verbenone; and/or vanillin;

ether and acetals, e.g. Ambrox® (3a,6,6,9a-tetramethyl-2,4,5,5a,7,8,9,9b-octahydro-1H-benzo[e][1]benzofuran); geranyl methyl ether ((2E)-1-methoxy-3,7-dimethylocta-2,6-diene); rose oxide (4-methyl-2-(2-methylprop-1-en-1-yl)tetrahydro-2H-pyran); and/or Spirambrene® (2',2',3,7,7-pentamethylspiro[bicyclo[4.1.0]heptane-2,5'-[1,3]dioxane]);

esters and lactones, e.g. benzyl acetate; cedryl acetate ((1S,6R,8aR)-1,4,4,6-tetramethyloctahydro-1H-5,8a-methanoazulen-6-yl acetate); γ-decalactone (6-pentyltetrahydro-2H-pyran-2-one); Helvetolide® (2-(1-(3,3-dimethylcyclohexyl)ethoxy)-2-methylpropyl propionate); γ-undecalactone (5-heptyloxolan-2-one); and/or vetiveryl acetate ((4,8-dimethyl-2-propan-2-ylidene-3,3a,4,5,6,8a-hexahydro-1H-azulen-6-yl) acetate);

macrocycles, e.g. Ambrettolide ((Z)-oxacycloheptadec-10-en-2-one); ethylene brassylate (1,4-dioxacycloheptadecane-5,17-dione); and/or Exaltolide® (16-oxacyclohexadecan-1-one); and heterocycles, e.g. isobutylquinoline (2-isobutylquinoline).

In yet another aspect of the present invention, there is provided a perfumed article, such as a fine fragrance or a personal or household care product, perfumed with a compound according to formula (IIa) or the isomeric mixture comprising (S,Z)-3,7-dimethylnon-6-en-1-ol (IIa).

The compound according to formula (IIa) or the isomeric mixture comprising (S,Z)-3,7-dimethylnon-6-en-1-ol (IIa) may be used in a broad range of perfumed articles, e.g. in any field of fine and functional perfumery, such as perfumes, air care products, household products, laundry products, body care products and cosmetics. The compound can be employed in widely varying amounts, depending upon the specific article and on the nature and quantity of other odourant ingredients. The proportion is typically from 0.0001 to 5 weight % of the article. In one embodiment, the compound of the present invention or the isomeric mixture comprising (S,Z)-3,7-dimethylnon-6-en-1-ol (IIa) may be employed in a fabric softener in an amount from 0.001 to 0.3 weight % (e.g. 0.01 to 0.1 including 0.05 weight %). In another embodiment, the compound according to formula (IIa) or the isomeric mixture comprising (S,Z)-3,7-dimethylnon-6-en-1-ol (IIa) may be used in fine perfumery but also in consumer products like shampoo, fabric softener or fabric detergents, in amounts from 0.001 to 30 weight % (e.g. up to about 10 or up to 20 weight %), more preferably between 0.01 and 5 weight %. However, these values are given only by way of example, since the experienced perfumer may also achieve effects or may create novel accords with lower or higher concentrations.

In one embodiment there is provided a perfumed article comprising an acceptable amount of the compound according to formula (IIa) or the isomeric mixture comprising (S,Z)-3,7-dimethylnon-6-en-1-ol (IIa). For example, the fragranced article may comprise 0.000001 weight % to 90 weight % (including 0.00001 weight %; 0.0001 weight %, 0.001 weight %, 0.01 weight %, 0.05 weight %, 0.1 weight %, 0.5 weight %, 1 weight %, 5 weight %, 8 weight %, 10 weight %, 15 weight %, 20 weight %, 25 weight %, 30 weight %, 50 weight %, 60 weight %, 65 weight %) of the compound or isomeric mixture based on the total amount of the article.

The compound according to formula (IIa) or the isomeric mixture comprising (S,Z)-3,7-dimethylnon-6-en-1-ol (IIa) may be employed in a consumer product base simply by directly mixing the compound of the present invention, or a perfume composition comprising the compound according to formula (IIa) or the isomeric mixture comprising (S,Z)-3,7-dimethylnon-6-en-1-ol (IIa), or a mixture thereof, with the consumer product base, or it may, in an earlier step, be entrapped with an entrapment material, for example, polymers, capsules, microcapsules and nanocapsules, liposomes, film formers, absorbents such as carbon or zeolites, cyclic oligosaccharides and mixtures thereof, and then mixed with the consumer product base.

Thus, the invention additionally provides a method of manufacturing a perfumed article, comprising the incorporation of the compound according to formula (IIa) or the isomeric mixture comprising (S,Z)-3,7-dimethylnon-6-en-1-ol (IIa), as a fragrance ingredient, either by directly admixing the compound to the consumer product base or by admixing a perfume composition comprising the compound according to formula (IIa) or the isomeric mixture comprising (S,Z)-3,7-dimethylnon-6-en-1-ol (IIa), which may then be mixed with a consumer product base, using conventional techniques and methods. Through the addition of an olfactory acceptable amount of the compound of the present invention as hereinabove described the odour notes of a consumer product base will be improved, enhanced, or modified.

Thus, the invention furthermore provides a method to confer, enhance, improve or modify the hedonic properties of a perfume composition or a consumer product, which method comprises adding to said perfume composition or consumer product the compound according to formula (IIa) or the isomeric mixture comprising (S,Z)-3,7-dimethylnon-6-en-1-ol (IIa).

As used herein, "consumer product base" means a composition for use as a consumer product to fulfill specific actions, such as cleaning, softening, and caring or the like. Examples of such products include fine perfumery, e.g. perfume and eau de toilette; fabric care, household products and personal care products such as cosmetics, laundry care detergents, rinse conditioner, personal cleansing composition, detergent for dishwasher, surface cleaner; laundry products, e.g. softener, bleach, detergent; body-care products, e.g. shampoo, shower gel; air care products (includes products that contain preferably volatile and usually pleasant-smelling compounds which advantageously can even in very small amounts mask unpleasant odours). Air fresheners for living areas contain, in particular, natural and synthetic essential oils such as pine needle oils, citrus oil, eucalyptus oil, lavender oil, and the like, in amounts for example of up to 50% by weight. As aerosols they tend to contain smaller amounts of such essential oils, by way of example less than 5% or less than 2% by weight, but additionally include compounds such as acetaldehyde (in particular, <0.5% by weight), isopropyl alcohol (in particular, <5% by weight), mineral oil (in particular, <5% by weight), and propellants.

Cosmetic products include:
(a) cosmetic skincare products, especially bath products, skin washing and cleansing products, skincare products, eye makeup, lip care products, nail care products, intimate care products, foot care products;
(b) cosmetic products with specific effects, especially sunscreens, tanning products, de-pigmenting products, deodorants, antiperspirants, hair removers, and shaving products;

(c) cosmetic dental-care products, especially dental and oral care products, tooth care products, cleaners for dental prostheses, adhesives for dental prostheses; and
(d) cosmetic hair care products, especially hair shampoos, hair care products, hair setting products, hair-shaping products, and hair coloring products.

Ethyl Citronellol (II) can be prepared in different processes, for example in a two-step process starting from ethyl linalool (III) as explained in the following example 1. Alternatively, it can be obtained in four steps starting from Citronellol (Biosci. Biotechnol. Biochem. 2002, 66, 582-587), or from methyl ethyl ketone in a seven step synthesis according to a report by Dragoco (1978 11/12, 235).

In one embodiment, the starting material for the process to prepare Ethyl Citronellol (II) is obtained from renewable resources. With such a starting material also the final product is accessible from renewable resources.

The present invention is now further described by the following, non-limiting examples.

EXAMPLES

Example 1. Preparation of 3,7-dimethylnon-6-en-1-ol (II)

Ethyl Citronellol (II) has been prepared in a two-step process, starting from ethyl linalool (III) via ethyl geraniol/ethyl nerol (IV):

a) 3,7-Dimethylnona-2,6-dien-1-ol (IV)

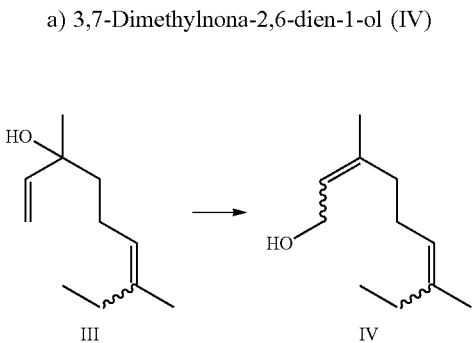

III                    IV

Under $N_2$, a 1000 mL 3-neck round bottomed flask equipped with a condenser was charged with ethyl linalool (III, 637.8 g, 3.79 mol), VO(OSiPh$_3$)$_3$ (20.1 g, 0.022 mol) and PhMe (139 g), and the solution was brought to reflux (heating plate set at 110° C.). The progress of the reaction was followed by GC until the equilibrium mixture of 70:30 ethyl linalool:ethyl geraniol/ethyl nerol (3,7-dimethylnona-2,6-dien-1-ol) was observed. After 3 h total reaction time, the reaction mixture was cooled to room temperature. PhMe was removed which afforded a crude light brown liquid (667 g). The reaction mixture was passed through a Wiped-film Evaporator (length=16 cm, OD 5.5 cm, 80° C., 0.04 mbar) which provided recovered VO(OSiPh$_3$)$_3$ (17 g) and crude material (ethyl linalool+ethyl geraniol/ethyl nerol mixture) (562.8 g). The crude material was filtered, and fractional distillation (Sulzer packed column (length=50 cm, ID 30 mm)) afforded ethyl linalool (250.1 g) and then ethyl geraniol/ethyl nerol (IV, 92 g, 100% purity, 48% isolated yield) as a mixture of four isomers in a 1:3.36:3.51:5.59 ratio.

Mixture of E/E, E/Z, Z/E and Z/Z isomers:

$^1$H-NMR (CDCl$_3$, 400 MHz): δ=5.47-5.37 (m, 4×1H), 5.14-5.03 (m, 4×1 H), 4.14 (d, J=6.8 Hz, 2×2H), 4.11-4.07 (m, 2×2H), 2.16-1.94 (m, 4×6H), 1.89 (br s, 4×1 H), 1.75 (m, 2×3H), 1.67 (m, 4×3 H), 1.60 (s, 2×3H), 1.00-0.94 (m, 4×3H) ppm.

$^{13}$C-NMR (CDCl$_3$, 100 MHz): δ=139.6 (s), 139.5 (s), 139.34 (s), 139.28 (s), 137.9 (s), 137.7 (s), 137.3 (s), 137.1 (s), 124.43 (d), 124.37 (d), 123.42 (d), 123.35 (d), 122.3 (d), 122.1 (d), 59.1 (t), 58.78 (t), 58.76 (t), 39.8 (t), 39.5 (t), 32.22 (t), 32.19 (t), 31.9 (t), 26.3 (t), 26.2 (t), 26.1 (t), 25.9 (t), 24.7 (t), 24.6 (t), 23.3 (q), 22.72 (q), 22.68 (q), 16.1 (q), 15.8 (q), 12.73 (q), 12.69 (q), 12.67 (q), 12.6 (q) ppm.

Major E/E isomer:
$^{13}$C-NMR (CDCl$_3$, 100 MHz): δ=139.3 (s), 137.1 (s), 123.4 (d), 122.3 (d), 59.1 (t), 39.5 (t), 32.2 (t), 26.2 (t), 16.1 (q), 15.8 (q), 12.7 (q) ppm.

Peak 1. MS (EI, Rt 6.43 min., 70 eV): 168 (1, [M]+•), 121 (9), 93 (17), 84 (14), 83 (33), 67 (15), 55 (100), 53 (10), 41 (39), 39 (15), 29 (11).

Peak 2. MS (EI, Rt 6.51 min., 70 eV): 168 (1, [M]+•), 121 (9), 93 (18), 84 (14), 83 (35), 67 (15), 55 (100), 53 (10), 41 (38), 39 (14), 29 (10).

Peak 3. MS (EI, Rt 6.62 min., 70 eV): 168 (0, [M]+•), 137 (9), 93 (9), 84 (8), 83 (37), 67 (13), 55 (100), 53 (9), 41 (36), 39 (12), 29 (10).

Peak 4. MS (EI, Rt 6.67 min., 70 eV): 168 (1, [M]+•), 93 (9), 84 (8), 83 (39), 67 (13), 55 (100), 53 (9), 43 (8), 41 (35), 39 (12), 29 (9).

b) 3,7-Dimethylnon-6-en-1-ol (II)

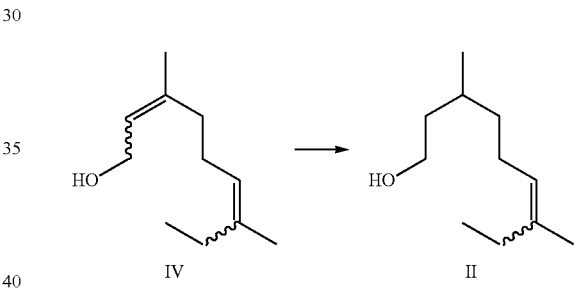

IV                    II

Under air atmosphere, 3,7-dimethylnon-6-en-1-ol (IV, 92 g, 0.547 mol, 100% purity) and MeOH (108 g) were added to a 500 mL autoclave vessel, followed by Raney Nickel (0.92 g, added in one shot in pellet form), and the vessel was sealed. Whilst stirring (600 rpm), the autoclave was flushed thrice with $N_2$ (1.8 bar), then three times with $H_2$ (2.0 bar). After adjusting the $H_2$-pressure to 10 bar, the autoclave was heated to 50° C. while stirring was increased to 1500 rpm. The reaction progress was followed by sampling. At t=6 h 39 min the heating of the autoclave and the $H_2$-flow were stopped. Once cooled, the pressure was released, and the autoclave was flushed three times with $N_2$ (1.8 bar). The reaction mixture was filtered to remove the heterogeneous catalyst, and MeOH was removed which provided 3,7-dimethylnon-6-en-1-ol (II, 78.6 g, 86.9% purity, 79.8% yield) as a colorless liquid, comprising two double bond isomers in a 2:1 ratio.

$^1$H-NMR (CDCl$_3$, 400 MHz): δ=5.14-5.03 (m, 2×1H, E+Z), 3.74-3.60 (m, 2×2H, E+Z), 2.09-1.89 (m, 2×4H, E+Z), 1.67 (q, J=1.2 Hz, 3H, Z), 1.60 (sb, 3H, E), 1.66-1.13 (m, 2×5H, E+Z), 0.98 (t, J=7.5 Hz, 3H, E), 0.96 (t, J=7.5 Hz, 3H, Z), 0.91 (d, J=6.7 Hz, 3H, E), 0.91 (d, J=6.6 Hz, 3H, Z) ppm.

$^{13}$C-NMR (CDCl$_3$, 100 MHz): δ=137.0 (s, Z), 136.7 (s, E), 124.3 (d, Z), 123.1 (d, E), 61.1 (2t, E+Z), 39.8 (2t, E+Z), 37.5 (t, Z), 37.2 (t, E), 32.3 (t, E), 29.2 (2d, E+Z), 25.3 (t,

E), 25.0 (t, Z), 24.7 (t, Z), 22.8 (q, Z), 19.5 (2q, E+Z), 15.8 (q, E), 12.8 (q, Z), 12.7 (q, E) ppm. Peak 1. MS (EI, Rt=6.43 min., 70 eV): 170 (3, [M]+•), 123 (39), 95 (18), 83 (18), 81 (42), 71 (18), 70 (19), 69 (21), 67 (26), 55 (100), 41 (45).

Peak 2. MS (EI, Rt=6.43 min., 70 eV): 170 (3, [M]+•), 123 (39), 95 (18), 83 (19), 81 (41), 71 (18), 70 (19), 69 (21), 67 (26), 55 (100), 41 (45).

Example 2. Stereoisomer Separation 3,7-Dimethylnon-6-en-1-ol (II) has been transformed to the corresponding 3,7-dimethylnon en-1-yl 4-nitrobenzoate (V) to enable for separation into individual isomers by SFC (supercritical fluid chromatography), followed by ester hydrolysis to the individual compounds (IIa), (IIb), (IIc) and (IId).

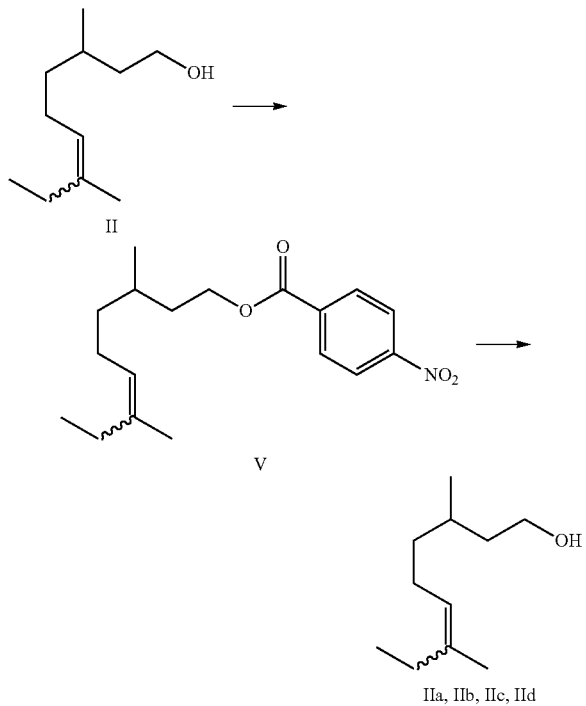

a) 3,7-dimethylnon-6-en-1-yl 4-nitrobenzoate (V)

To a stirred solution of compound 1 (5 g, 29 mmol, 1 equiv) in DCM (100 mL) at 0° C. were added p-nitrobenzoic acid (2) (7.35 g, 44 mmol, 1.5 equiv), DCC (11.3 g, 55 mmol, 1.9 equiv), and DMAP (1.41 g, 11.6 mmol, 0.4 equiv). It was stirred at rt for 16 h. The reaction mixture was filtered, and the filtered solid was washed with DCM (50 mL). The filtrate was washed with water (200 mL), dried over sodium sulfate and concentrated under reduced pressure. The crude product (V) was purified by HPLC to afford 3 (6 g, 64%) as a colourless liquid.

b) SFC Separation

Compound (V) (6 g) was subjected to SFC purification (15% co-solvent: 0.5% isopropyl amine in methanol, Column: Lux A1 (250×30 mm, 5μ), Flow rate: 3 ml/min) to obtain four fractions (Vc), (Va), (Vb) and (Vd).

c) Ester Hydrolysis

To a stirred solution of compound Va in THF-MeOH—$H_2O$ (7:2:1 vol) at rt was added LiOH·$H_2O$ (2 equiv). It was stirred at rt for 2 h. The reaction mixture was concentrated under reduced pressure, diluted with water and extracted with EtOAc. The combined organic layer was dried over sodium sulfate and concentrated under reduced pressure. The crude product was purified by flash column chromatography using 6-7% EtOAc in pet ether as eluent to afford IIa as a colorless liquid.

Compounds (Vb), (Vc) and (Vd) have been hydrolysed accordingly to yield compounds (IIb), (IIc) and (IId), respectively. The configuration of the individual isomers has been assigned by chiral GC and NMR analysis.

Example 3. Perfumery Example

In the following accord, compound (IIa), a mixture of (S)-isomers (IIa) and (IIc) and Citronellol have been compared. This shower gel accord should be applied at 1 to 1.5% in the end use base.

| CAS-No. | ingredient name | A parts by weight | B parts by weight | C parts by weight |
|---|---|---|---|---|
| 112-31-2 | ALDEHYDE C 10 DECYLIC | 3 | 3 | 3 |
| 8007-75-8 | BERGAMOT OIL ITALY | 70 | 70 | 70 |
| 19872-52-7 | BLACKCURRANT BODY 1%/TEC | 2 | 2 | 2 |
| 147060-73-9 | CITRATHAL R | 5 | 5 | 5 |
| 5718-75-2 | CORPS PAMPLEMOUSSE PURE 10%/TEC | 3 | 3 | 3 |
| 23696-85-7 | DAMASCENONE GIV 10% TEC | 12 | 12 | 12 |
| 5182-36-5 | FLOROPAL | 16 | 16 | 16 |
| 1222-05-5 | GALAXOLIDE S | 40 | 40 | 40 |
| 93-92-5 | GARDENOL | 8 | 8 | 8 |
| 105-87-3 | GERANYL ACETATE SYNTHETIC | 60 | 60 | 60 |
| 24851-98-7 | HEDIONE | 90 | 90 | 90 |
| 3681-71-8 | HEXENYL-3-CIS ACETATE | 10 | 10 | 10 |
| 142-92-7 | HEXYL ACETATE | 80 | 80 | 80 |
| 6259-76-3 | HEXYL SALICYLATE | 80 | 80 | 80 |
| 1335-46-2 | ISORALDEINE 70 | 30 | 30 | 30 |
| 198404-98-7 | JAVANOL | 1 | 1 | 1 |
| 8008-56-8 | LEMON OIL DISTILLED | 60 | 60 | 60 |
| 78-70-6 | LINALOOL SYNTHETIC | 120 | 120 | 120 |
| 20407-84-5 | DODECENAL | 20 | 20 | 20 |
| 39255-32-8 | MANZANATE | 10 | 10 | 10 |
| 89079-92-5 | NEOCASPIRENE EXTRA 10% DPG | 4 | 4 | 4 |
| 1637294-12-2 | NYMPHEAL | 10 | 10 | 10 |
| 68514-75-0 | ORANGE OIL PHASE DIST | 80 | 80 | 80 |
| 406488-30-0 | PARADISAMIDE | 10 | 10 | 10 |
| 916887-53-1 | PETALIA | 10 | 10 | 10 |
| 104-20-1 | METHOXY PHENYL BUTANONE | 3 | 3 | 3 |
| 16409-43-1 | ROSE OXIDE CO 10% DPG | 5 | 5 | 5 |
| 676532-44-8 | SYLKOLIDE | 15 | 15 | 15 |
| 68039-49-6 | TRICYCLAL | 3 | 3 | 3 |
|  | Citronellol | 50 | — | — |
|  | (S)-Ethyl Citronellol - IIa + IIc | — | 20 | — |
|  | (S,Z)-Ethyl Citronellol - IIa | — | — | 10 |
| 25265-71-8 | DIPROPYLENE GLYCOL | 90 | 120 | 130 |
|  | total | 1000 | 1000 | 1000 |

The general accord gives a fresh juicy fruity citrus accord, with a mainly fresh citrus lemon top note, combined with a rosy raspberry lychee heart note.

Citronellol (used in accord A) supports the rosy freshness in general on neat and bloom in use.

(S)-Ethyl Citronellol (IIa+IIc, used in accord B), brings an additional hedonic freshness and naturalness to the accord on neat and in use. Additionally, it delivers a significant benefit with a clearly improved bloom and diffusion during the shower experience.

(S,Z)-Ethyl Citronellol (IIa, used in accord C), delivers both, an intense floral rosy character and a pleasant juicy fruity lychee feeling to the composition, which in comparison to Citronellol delivers a preferred intensity on neat, a superior bloom and room filling in use, with the clear hedonic benefit, even when added 5 fold less. In comparison to the racemic (S)-Ethyl Citronellol, this specific isomer delivers the bloom and pleasant hedonic character without the more technical and rough facet of the (S,E)-isomer.

Example 4. Comparison of GC Thresholds

In the following table, the GC thresholds of Citronellol, Linalool, and the mixture of geraniol-nerol is compared with the corresponding so called ethyl analogues, formally extended by one methyl group.

| Compound | GC threshold in ng |
| --- | --- |
| Citronellol | 1.8 |
| Ethyl Citronellol | 0.22 |
| Linalool | 4 |
| Ethyl Linalool | 8.7 |
| Geraniol/Nerol mixture | 2.9 |
| Ethyl-Geraniol/-Nerol mixture | 1.6 | with Linalool: 3,7-Dimethyl-1,6-octadien-3-ol; Ethyl Linalool: 3,7-Dimethylnona-1,6-dien-3-ol; Geraniol/Nerol: E/Z-3,7-Dimethyl-2,6-octadien-1-ol; Ethyl-Geraniol/-Nerol: E/Z-3,7-Dimethylnona-2,6-dien-1-ol.

It can be seen, that typically, the replacement of a methyl group by an ethyl group does not significantly alter the GC threshold which is related to the impact or performance of the compound. In case of Ethyl Citronellol it is surprising, that the compound has a significantly higher performance then the methyl analogue Citronellol.

The invention claimed is:

1. A compound according to formula (IIa), which is (S,Z)-3,7-dimethylnon-6-en-1-ol

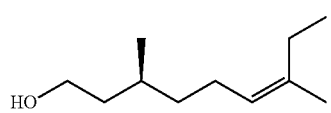
(IIa)

2. An isomeric mixture comprising the compound as defined in claim 1 and at least one further compound selected from the group consisting of the compound according to formula (IIb), the compound according to formula (IIc), and the compound according to formula (IId)

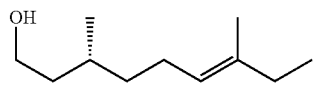
(IIb)

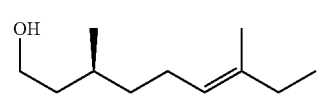
(IIc)

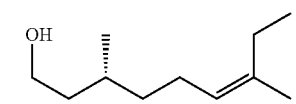
(IId)

3. Use of A method of using a compound of formula (II)

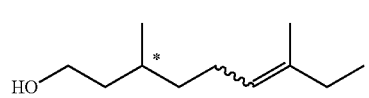
(II)

wherein the star indicates a stereocenter at the C-atom, and the wavy bond indicates an unspecified configuration of the adjacent double bond, as fragrance, wherein the method comprises adding the compound of formula (II) to a perfume composition or to a consumer product base.

4. A method of using the compound of formula (IIa) as defined in claim 1 as fragrance, wherein the method comprises adding the compound of formula (IIa) to a perfume composition or to a consumer product base.

5. A method of improving, enhancing, or modifying a consumer product base by means of addition thereto of an olfactory acceptable amount of the compound of formula (II) as defined in claim 3.

6. A fragrance application comprising as odourant the compound of formula (IIa) as defined in claim 1 and a consumer product base.

7. The fragrance application according to claim 6, wherein the consumer product base is selected from fine fragrance, household products, laundry products, body care products, cosmetic products, and air care products.

8. A fragrance composition comprising the compound of formula (IIa) as defined in claim 1 and a base material.

9. A method of using the isomeric mixture as defined in claim 2 as fragrance, wherein the method comprises adding the isomeric mixture to a perfume composition or to a consumer product base.

10. A method of improving, enhancing, or modifying a consumer product base by means of addition thereto of an olfactory acceptable amount of the compound of formula (IIa) as defined in claim 1.

11. A method of improving, enhancing, or modifying a consumer product base by means of addition thereto of an olfactory acceptable amount of the isomeric mixture as defined in claim 2.

12. A fragrance application comprising as odourant the isomeric mixture as defined in claim 2 and a consumer product base.

13. The fragrance application according to claim 12, wherein the consumer product base is selected from fine fragrance, household products, laundry products, body care products, cosmetic products, and air care products.

14. A fragrance composition comprising the isomeric mixture as defined in claim 2 and a base material.

15. The isomeric mixture according to claim 2, wherein the amount of the compound of formula (IIa) is about 20 wt. % to about 50 wt. %.

16. The isomeric mixture according to claim 2, wherein the weight ratio of the compound of formula (IIa) to the at least one further compound is about 4:6 to about 99:1.

* * * * *

UNITED STATES PATENT AND TRADEMARK OFFICE
CERTIFICATE OF CORRECTION

| | | |
|---|---|---|
| PATENT NO. | : 12,492,158 B2 | Page 1 of 1 |
| APPLICATION NO. | : 17/905876 | |
| DATED | : December 9, 2025 | |
| INVENTOR(S) | : Kimberly Geoghegan et al. | |

It is certified that error appears in the above-identified patent and that said Letters Patent is hereby corrected as shown below:

On the Title Page

Item (30) should be added to read "April 2, 2020 (GB) .......... 2004876"

Signed and Sealed this
Sixth Day of January, 2026

John A. Squires
*Director of the United States Patent and Trademark Office*